(12) United States Patent
Nordgren et al.

(10) Patent No.: US 7,286,919 B2
(45) Date of Patent: Oct. 23, 2007

(54) METHOD AND APPARATUS FOR CONTROLLING DAMPING OF A VEHICLE SUSPENSION

(75) Inventors: John Nordgren, Trollhattan (SE); Robert Wahlberg, Trollhattan (SE); Tomas Ostlund, Huddinge (SE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/436,316

(22) Filed: May 18, 2006

(65) Prior Publication Data

US 2007/0088475 A1    Apr. 19, 2007

Related U.S. Application Data

(60) Provisional application No. 60/727,599, filed on Oct. 17, 2005.

(51) Int. Cl.
*B60G 17/00* (2006.01)
(52) U.S. Cl. .............................. 701/37; 701/38; 701/48; 280/5.515
(58) Field of Classification Search ................. 701/37, 701/38, 48, 91; 280/5.502–5.515
See application file for complete search history.

(56) References Cited

U.S. PATENT DOCUMENTS

| | | | |
|---|---|---|---|
| 4,652,010 A | 3/1987 | Sugasawa | 280/707 |
| 5,071,157 A | 12/1991 | Majeed | 280/707 |
| 5,276,621 A | 1/1994 | Henry et al. | |
| 5,475,596 A | 12/1995 | Henry et al. | |
| 5,497,324 A | 3/1996 | Henry et al. | |
| 5,559,700 A | 9/1996 | Majeed et al. | |
| 5,570,288 A | 10/1996 | Badenoch et al. | |
| 5,570,289 A | 10/1996 | Stacey et al. | |
| 5,692,587 A | 12/1997 | Fratini, Jr. | |
| 5,696,677 A | 12/1997 | Leaphart et al. | |
| 5,897,130 A | 4/1999 | Majeed et al. | |
| 5,941,919 A | 8/1999 | Pastor et al. | |
| 6,112,147 A | 8/2000 | Ghoneim et al. | |
| 6,219,602 B1 * | 4/2001 | Badenoch et al. | 701/37 |
| 6,397,134 B1 * | 5/2002 | Shal et al. | 701/37 |
| 6,513,382 B2 | 2/2003 | Tanaka et al. | |
| 6,839,524 B2 * | 1/2005 | Yamaguchi et al. | 399/2 |
| 2002/0138186 A1 | 9/2002 | Kim | |
| 2005/0113998 A1 | 5/2005 | Kim | |
| 2005/0133978 A1 | 6/2005 | Lemmens | |

OTHER PUBLICATIONS

International Search Report for PCT Appln No. PCT/US06/40446 dated Jul. 30, 2007 and corresponding to this application.

* cited by examiner

*Primary Examiner*—Richard M. Camby

(57) ABSTRACT

A method and algorithm for semi-active suspension damper control is described. The algorithm controls the damper setting to limit vehicle body movement in terms of body modal velocities of heave, roll and pitch. The main input, body movement, is measured with accelerometers. The control output comprises a request in percent of damper control range. Vehicle speed-dependent minimum and maximum limits are applied. The method includes monitoring vehicle speed and a modal sensing system. A common damping rate for the dampers is determined based upon parameters for speed, heave, pitch, and roll. Each damper is controlled based upon the common damping rate adjusted based upon a location of each of the controllable suspension dampers. The output comprises a single signal, translated to a front and rear setting. The purpose is to always have a balanced setting of the four dampers.

27 Claims, 2 Drawing Sheets

METHOD AND APPARATUS FOR CONTROLLING DAMPING OF A VEHICLE SUSPENSION

CROSS-REFERENCE TO RELATED APPLICATIONS

This application claims priority from U.S. Provisional Application No. 60/727,599, filed Oct. 17, 2005, entitled METHOD AND APPARATUS FOR CONTROLLING DAMPING OF A VEHICLE SUSPENSION.

TECHNICAL FIELD

This invention pertains generally to vehicle systems, and more specifically to active control of vehicle suspension systems.

BACKGROUND OF THE INVENTION

Current systems for controlling active vehicle suspensions require many sensors, including, e.g. accelerometers. A typical system includes a standard sensor layout requiring as many as five accelerometers, including three on the car body to measure heave, pitch and roll, and one at each of the front wheels. Another area of concern for current systems which provide damping by controlling damping force is that when force requests are not correlated to damper velocities, the control force is often unattainable. The result may be that a requested damping force is only realized on one or some of the dampers. The damping force request is translated through a lookup table into a control electrical current using an estimated damper velocity and the requested force. Special functions are needed to avoid the dampers providing high levels of damping, i.e., hard damping, at low damper velocities for a moderate force request. Furthermore, although the control input is a low frequency (2-3 Hz) the control electrical current to the dampers varies at about 15 Hz, which is a governing frequency for wheel movement. This last effect leads to problems with damping system control valve noise. Therefore there is a need for a damping control system which addresses the above concerns.

SUMMARY OF THE INVENTION

In accordance with the present invention, a system and control method which address the above concerns are described herein. The invention comprises a system and method to control damping of a suspended system, such as a vehicle, using controllable suspension dampers to apply a damper setting as a function of body modal velocities.

The invention includes a control algorithm for semi-active suspension dampers. The concept is to provide low-cost, effective suspension system having a limited number of sensors. A typical prior art suspension control algorithm needs special functions to address potential harshness problems. In this invention, the control signal output to each damper is damper setting, rather than force. The result is significantly less high frequency content in damper control, and an ability to prevent damper control to a hard setting at a near-zero damper velocity. All dampers are preferably controlled simultaneously. When applied to a vehicle, there is a balanced damper setting front-to-rear, through the use of calibration lookup tables.

The invention measures up to three degrees of freedom off motion on the vehicle body to calculate modal velocities. The dampers are continuously adjusted in phase depending on the measured modal velocities. Other existing signals used as inputs include vehicle speed, steering wheel angle, applied brake pressure, and vehicle lateral acceleration. The control output is damper setting. This changes the dominating frequency of the current control from 15 Hz to a range of 2-3 Hz, thus reducing the risk for control valve noise.

The algorithm reduces the need for sensors, e.g. accelerometers, and provides the benefits of semi-active dampers. The main control inputs are vehicle reference speed and body modal velocities. The output from the body modal control is a control request, comprising a signal which is a percentage of the damper control range. The output comprises a single signal or channel, and each signal is translated to a front and rear setting, using a translation table. There is no requirement for information about wheel or damper movement, in contrast to prior art systems. However if, for example, height sensors are implemented in the vehicle for use in another subsystem, the information can be used to provide additional information for the damper control.

The system uses fewer accelerometer sensors than typical systems, which may cause the system to be unable to detect when lack of movement of the body is due to excess damper settings. This is overcome by limiting a rate of change of the damper setting. The rate-limiting of damper setting is preferably calibrated to prevent an over-response to a short sharp bump but still fast enough to react to body movement in the low frequency range. The limitation is expressed in percent per second, such that a value of 500 percent per second means that the elapsed time to go from 0% to 100% is 0.2 seconds.

Therefore, in accordance with the present invention, a method, executed as an algorithm in a controller is provided to control damping of a suspended body such as a vehicle using a plurality of controllable suspension dampers. The method and the algorithm comprise determining vehicle forward velocity, and monitoring input from a modal sensing system. Parameters for heave, pitch, and roll, are determined based upon the input from the modal sensing system. A common damping rate for the controllable suspension dampers is determined based upon the vehicle forward velocity and the determined parameters for heave, pitch, and roll. Each of the controllable suspension dampers is controlled based upon the common damping rate adjusted based upon a location of each of the controllable suspension dampers.

An aspect of the present invention includes adjusting the common damping rate to a substantially nil damping rate when the vehicle speed is substantially zero.

Another aspect of the invention includes adjusting the common damping rate based upon steering wheel angle. This further includes adjusting the common damping rate based upon a rate of change of the steering wheel angle.

Another aspect of the invention includes adjusting the common damping rate based upon an operator-selectable damper mode, and upon an operator request for braking.

Another aspect of the invention includes the modal sensing system, which comprises a plurality of accelerometers, each located near a corner of the vehicle and each operable to monitor vehicle heave. This includes executing a time-based integration of signal outputs from the accelerometers to determine parameters for vehicle heave, pitch, and roll. Alternatively, the modal sensing system comprises a device having a plurality of sensing devices operable to monitor vehicle body modal velocities, and operable to determine parameters for vehicle heave, pitch, and roll based thereon.

Another aspect of the invention includes controlling each of the controllable suspension dampers as a percent of a maximum damper setting, and limiting damper setting to a minimum damper value and a maximum damper value. The minimum and maximum damper values are each determined based upon the vehicle forward velocity.

Another aspect of the invention includes limiting a rate of change of the damper setting.

The benefits of the system, in the form of effect upon cost, durability, and system performance include a cost reduction resulting from use of fewer sensors than current systems. Furthermore, magnitude of noise, vibration and harshness (NVH) are reduced due to less valve noise. The system, having fewer components, e.g. sensors, is less likely to experience faults, leading to improved system reliability. The system is simpler to tune due to less need for special functions.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
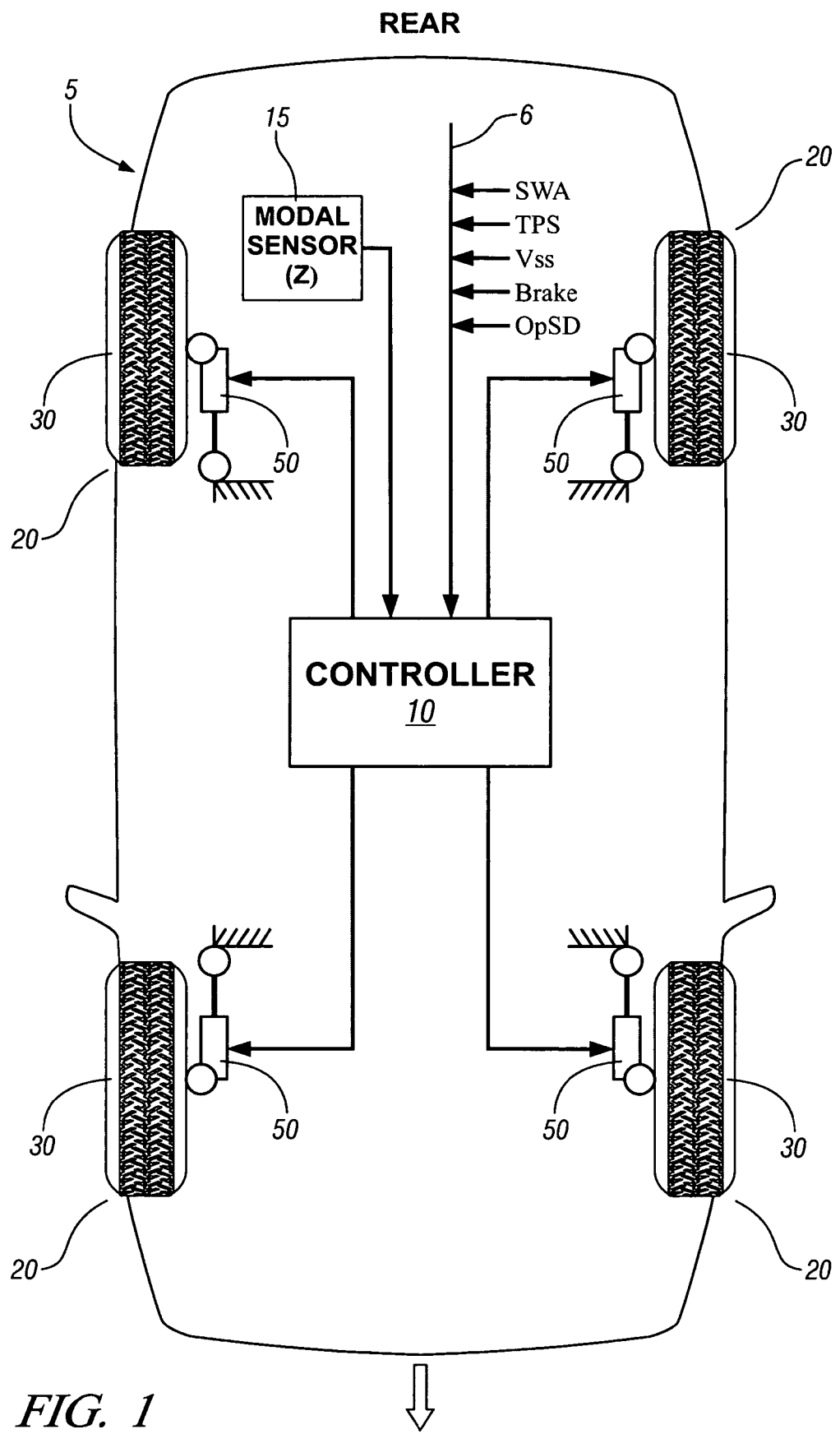
FIG. 1 comprises a schematic diagram of a vehicle, in accordance with the present invention.

Referring now to the drawings, wherein the showings are for the purpose of illustrating the invention only and not for the purpose of limiting the same, FIG. 1 shows a system which has been constructed in accordance with an embodiment of the present invention. The exemplary system comprises a passenger vehicle 5 intended for use on highways, although it is understood that the invention described herein is applicable on vehicles and other suspended bodies that are able to employ a controllable suspension damping system.

Referring again to FIG. 1, the exemplary vehicle 5 includes a plurality of systems, including a propulsion system and a controllable suspension damping system. The vehicle architecture preferably includes a control system operable to control various vehicle systems through execution of embedded algorithms and calibrations. The typical control system is able to control various vehicle systems by using one or more embedded controllers to execute on-board algorithms and calibrations to control various actuators based upon inputs from a plurality of on-board sensing systems.

The vehicle propulsion system comprises any one of several known propulsion systems operable to provide tractive torque to one or more of the vehicle wheels through a transmission device and driveline, in response to operator inputs which typically include a torque demand through an accelerator pedal, and a brake demand through a brake pedal. The propulsion system may comprise a conventional internal combustion engine and transmission, or any of several hybrid systems including those employing various electric machines and electrically-variable transmission devices, and electrically driven wheels and drivelines.

The exemplary controllable suspension damping system is an integral part of a chassis of the vehicle and includes a modal sensing system 15 and a plurality of controllable variable damping devices 50, each signally and/or operably connected to a controller 10. The exemplary vehicle 5 includes four corner assemblies 20. Each corner assembly typically comprises one or more control arms attached to the vehicle chassis that is adapted to move in a primarily up-and-down motion relative to the vehicle chassis. An end of each control arm that is distal to the vehicle chassis is attached to a wheel assembly that typically includes bearings, a brake system, and a hub. A wheel including a pneumatic tire mounted on a wheel rim is attached to the wheel assembly. At least one controllable variable damping device 50 is attached between a lower control arm of each corner assembly and a mounting location on the chassis, and operable to provide controlled damping therebetween.

Each controllable variable damping device 50 comprises an adjustable damping device operable to change rate of damping in response to an excitation signal, preferably one provided by the controller 10 as shown in FIG. 1. A changing rate of damping permits control of damping on each corner over a range from a firm setting to a soft setting. Damping rate is typically characterized in terms of damper velocity or travel rate (meters per second) in response to a linear force input (in Newtons). A firm setting comprises a slower travel rate in response to a linear force input, whereas a soft setting comprises a faster travel rate in response to the same magnitude of force input. A controllable variable damping device 50 may comprise any one of several known variable damping devices, including, e.g. hydraulically controlled devices, pneumatically controlled devices, electrically controlled devices, and magneto-rheological devices. A preferred operating requirement of the control system and method described herein is that the controllable variable damping devices 50 have a response time in an order of magnitude of 50 milliseconds, in order to effectively control damping. The response time comprises elapsed time for the damper to change from 0% damping to 100% damping, i.e. from fully firm to fully soft, and vice versa. Other devices having controllable damping systems may have different response time requirements, which are driven by natural frequencies of the specific suspended device.

The modal sensing system 15 is operable to monitor and sense movement of the vehicle 5 relative to the wheels 30 and a road surface. A preferred reference coordinate system comprises an x-y-z coordinate system, having a positive x-axis oriented towards the vehicle front, a positive y-axis oriented towards the operator's left, and a positive z-axis oriented and pointing upwards. The modal sensing system 15 is operable to monitor and determine parametric values for vehicle body modal velocities of heave, pitch, and roll (i.e., $V_H$, $V_P$, $V_R$). Roll and pitch are defined as positive rotation around the vehicle x and y-axis respectively. Heave is defined as movement along the z-axis. The modal sensing system 15 can comprise a single device, containing a plurality of accelerometers, mounted at an appropriate location in the vehicle, preferably near the XY center of gravity of the vehicle, and operable to monitor the vehicle body modal velocities. Alternatively, the modal sensing system 15 may comprise one, two, or three accelerometers mounted at appropriate locations in the vehicle, preferably at the two corners at the front of the vehicle and one of the corners at the rear of the vehicle, each operable to monitor vehicle heave. Output signals from the accelerometers can be translated to the body modal velocities of heave, pitch, and roll (i.e., $V_H$, $V_P$, $V_R$) as described hereinbelow. Signal outputs from the modal sensing system 15 are input to the suspension controller 10 for use in an algorithm which provides active control of the vehicle suspension, as is described hereinafter. Output signals from the accelerometers may be useable by other vehicle systems such as electronic stability control to adjust front/rear balance of the adjustable dampers 50 to help eliminate yaw error.

The sensor signals may have undesirable higher frequency noise content or a DC offset. The high frequency noise can be filtered out with a low pass filter. The DC offset or low frequency noise can be filtered out using a high pass filter or by simply subtracting the average over a suitable time. Since it is generally the integrated value from the accelerometers that is of interest in the control scheme, any offset may have a significant effect on the resulting signal were the raw signal simply integrated. Filters must be chosen carefully and only be used when necessary as filtering introduces delays in system response time. By using a transfer function as shown in Eq. 1, below, a signal from any of the sensors can be de-trended and integrated at the same time.

$$G(s) = \frac{K_0 s}{s^2 + \alpha s + \beta}$$ Eq. 1

The suspension controller 10 shown with reference to FIG. 1, and described hereinafter, comprises a subset of a distributed controller architecture operable to provide coordinated vehicle control, including the active suspension system. The suspension controller 10 is operable to gather and synthesize pertinent information and inputs, and execute algorithms to control various actuators to achieve control targets, including specifically vehicle damping. The suspension controller 10 is preferably operable to provide diagnostic support.

The suspension controller 10 is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. The computer has a set of control algorithms, comprising resident program instructions and calibrations stored in ROM and executed to provide the respective functions described.

Algorithms for control and state estimation in the suspension controller 10 are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of various devices, using preset calibrations. Loop cycles are typically executed at regular intervals, for example each 3.125, 6.25, 12.5, 25 and 100 milliseconds during ongoing vehicle operation. Alternatively, algorithms may be executed in response to occurrence of an event.

The vehicle operator typically controls or directs operation of the vehicle through a plurality of input devices, including, e.g. a steering wheel, an accelerator pedal, transmission gear selection, a brake pedal, and cruise control system. Another operator input includes a suspension switch, wherein the operator is able to select vehicle handling performance, e.g. maximizing sport/handling responsiveness, or maximizing passenger comfort. Exemplary vehicle operator inputs to the suspension controller 10 are preferably provided by other on-vehicle sensing systems operable to provide input to the control system, including throttle position ('TPS') for accelerator pedal and cruise control, brake force request ('Brake') for the brake pedal, steering wheel angle ('SWA') for steering wheel input, and operator-selectable damping input ('OpSD') for vehicle handling performance, and comprise inputs from sensing systems on the vehicle. The sensing systems for various operator inputs are known and not described in detail herein. The inputs from the aforementioned sensing systems are typically used by other controllers, communicated thereto via a local area network ('LAN') communications bus 6. The LAN bus 6 is a known device that effects structured communication of control parameters and commands between the various controllers. The LAN bus 6 executes communications protocols to provide for robust messaging and multi-controller interfacing between the aforementioned controllers, and other controllers providing functionality such as antilock brakes and traction control.

Figure 2:
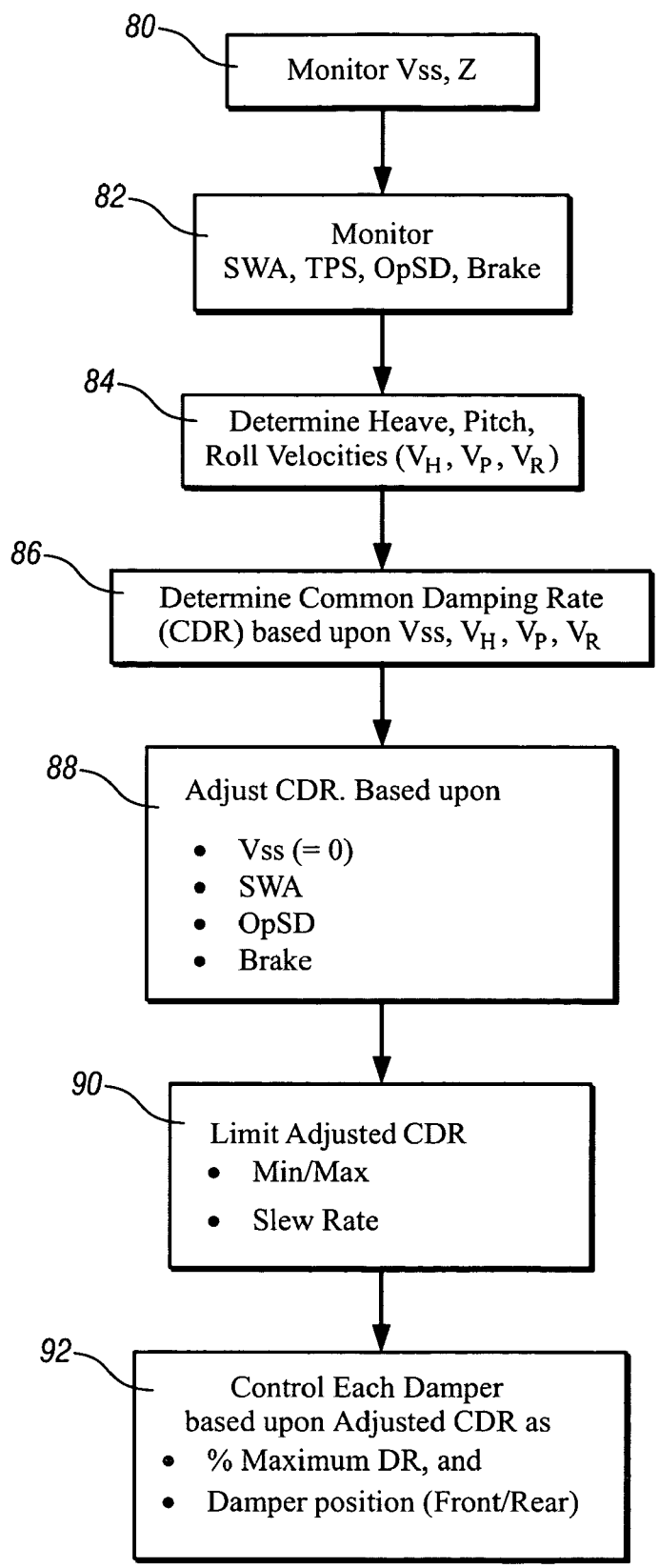
FIG. 2 comprises an algorithmic flow diagram, in accordance with the present invention.

Referring now to FIG. 2, a high level view of the algorithm for controlling operation of the variable damping system described with reference to FIG. 1 is shown, as executed using a block diagram approach. In operation, vehicle forward velocity, or speed (Vss), and the body modal velocities (Z) are monitored using input from the modal sensing system 15 (Block 80). Other operator inputs are monitored, including steering wheel angle (SWA), operator torque request, typically in a form of throttle position (TPS), brake request (brake), and operator-selectable damping (Block 82). Parametric values for vehicle heave, pitch and roll velocities ($V_H$, $V_P$, $V_R$) are determined based upon the body modal velocities input from the modal sensing system (Block 84). A common damping rate for the controllable suspension dampers is determined based upon the vehicle forward velocity and the determined parameters for heave, pitch, and roll (Block 86). The common damping rate is adjusted, to accommodate the vehicle speed, the steering wheel angle, the operator-selectable damping, and the operator brake request (Block 88). Limits are applied to the adjusted common damping rate, based upon minimum and maximum damping rates and a slew rate, or rate of change of the damping rate (Block 90). Each damper 50 is controlled based upon the limited adjusted common damping rate. Damper control includes controlling damping as a percentage of the maximum damping rate. Damper control is translated based upon whether the damper 50 is in a front position or a rear position on the vehicle, preferably using a translation table (Block 92). The damper control signals are sent to each of the controllable variable suspension dampers 50 to effect modal control with compensation for lateral acceleration, steering wheel angle, and other factors. Control signals are preferably sent simultaneously from the controller 10 to the suspension dampers 50 to provide a balanced setting of the vehicle.

In operation, when there is minimal body movement, the dampers are soft (i.e. under damped) compared to a passive damper. As body movement increases, the algorithm determines an appropriate damper setting. As previously discussed, the primary control target of the algorithm is body motion, having a frequency in the range of 2 Hz for a typical passenger vehicle. The system needs to respond quickly to an input, but still able to vary with the same frequency as the body motion.

The primary input parameters for modal control comprise the body modal velocities, i.e. heave, pitch and roll (Block 84). These parameters are typically calculated by integration of the aforementioned modal velocities (Z) from the modal sensing system 15. Calculation of velocities for heave, pitch and roll (i.e. ($V_H$, $V_P$, $V_R$) are shown in Eq. 2, 3, and 4 below. The equations to calculate vehicle heave, $V_H$, vehicle roll, $V_R$, and vehicle pitch, $V_P$, are as follows:

$$V_H = \int \frac{(a_{Z_{LF}} + a_{Z_{RR}})}{2} dt \qquad \text{Eq. 2}$$

$$V_P = \int (a_{Z_{RF}} - a_{Z_{RR}}) dt \qquad \text{Eq. 3}$$

$$V_R = \int (a_{Z_{LF}} - a_{Z_{RF}}) dt \qquad \text{Eq. 4}$$

wherein corner position of each accelerometer is denoted as: LF for left front, RF for right front and RR for right rear. The terms $a_{Z/LF}$, $a_{Z/RF}$, $a_{Z/RR}$ comprise parametric values for outputs from each accelerometer, located as previously described.

The common damping rate for the controllable suspension dampers is determined based upon the vehicle forward velocity and the determined parameters for heave, pitch, and roll (Block 86). Heave control inputs comprise body heave velocity, $V_H$, measured in meters per second, with vehicle reference speed, Vss in meters per second. The reference speed is used for a speed-dependent gain which is multiplied with the modal velocity amplified by a single gain. The speed-dependent gain is split into two different tables to allow for different gain depending on the arithmetic sign of the heave velocity. The modal velocity gain depends upon which operator-selectable damping mode is engaged, typically referred to as comfort mode or sport mode. Typically a positive heave velocity (body moves up) corresponds to dampers working in rebound and a negative to dampers working in compression. Roll Control comprises a control scheme wherein there is a single velocity-dependent gain table. There are separate tuning parameters for the roll control. However, there is seldom a road-induced roll motion without heave. This means the heave control may react to road induced roll. For steering-induced roll there is another function. The pitch control function has a single velocity-dependent gain table. There are separate tuning parameters for the pitch control. There is seldom a road induced pitch motion without heave. This means the heave control may react to road-induced pitch.

The common damping rate is adjusted, to accommodate the vehicle speed, the steering wheel angle, the operator-selectable damping mode, and the operator brake request (Block 88). The operator-selectable damping mode typically comprises operating in sports mode or comfort mode, which comprises operating with a different linear gain on the damping rates. Furthermore, there are separate minimum and maximum limits, as described in the section about damper control limitation. Furthermore, the steering wheel-based control has a different gain values for sport and comfort mode operations.

Compensation for steering wheel angular velocity is based on vehicle speed and steering wheel rate, wherein an increase in speed leads to an increase in the control request. Inputs are vehicle speed Vss and steering wheel angle (SWA). The basis for the control is SWA-rate. The SWA-rate dependent request is weighted depending on vehicle speed. There is, for example, no need for hard damper settings while parking, even though the SWA-rate is relatively high. The steering wheel angular velocity-based compensation function provides high damping while entering a turn to increase vehicle responsiveness. During steady state cornering, body control is handled by the modal control. A delay function has been developed that waits a calibratable time before decreasing the control output. The delay time is calibratable, independent of amplitude. The SWA compensation may include a lateral acceleration augmentation function, which provides the option to increase the damper setting when the vehicle is engaged in steady state cornering. Inputs to this function are vehicle lateral acceleration and vehicle reference speed. The tuning parameters are two look-up calibration tables, one for each input. The layout is very similar to that of SWA-rate control. The output is weighted depending on reference speed, Vss, and lateral acceleration.

Limits are applied to the adjusted common damping rate, based upon minimum and maximum damping rates and a slew rate, or rate of change of the damping rate (Block 90). The damper control limitation comprises speed-dependent minimum and maximum limits. There are separate limits that are used to reduce brake pitch. During vehicle standstill, there is a function to save energy by setting the dampers at low or substantially no input (i.e. close to zero voltage), resulting in a hard damping response for typical damping devices. Each damper 50 is controlled based upon the limited adjusted common damping rate. Damper control includes controlling damping as a percentage of the maximum damping rate. Damper control is translated based upon whether the damper 50 is in a front position or a rear position on the vehicle. Minimum and maximum limits are dependent upon vehicle reference speed, and comprise calibration look-up tables. There are preferably separate calibration tables for the operator-selectable damping, i.e. operating in the sports mode or the comfort mode.

There are minimum and maximum damping limits during braking to provide separate damper limitations during braking when the vehicle is operating at a speed below a calibratable speed, to reduce brake pitch as the vehicle stops. This is shown as a logic table.

Damper control is translated based upon whether the damper 50 is in a front position or a rear position on the vehicle, preferably using a translation table (Block 92). The purpose of the translation from the overall damper setting provides balanced front and rear settings for the suspension control system.

When the vehicle 5 has been stationary, (i.e. Vss=0, or no inputs to the modal sensing system 15 if the system is applied to a stationary system) for a calibratable amount of time, the dampers are set to a hard value, i.e. there is little or substantially no actuating current flowing to the dampers, until the vehicle starts moving again.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a storage medium having a computer algorithm encoded therein for effecting a method to control damping of a suspended body using a plurality of controllable suspension dampers, the algorithm comprising:

code to determine vehicle forward velocity;

code to monitor input from a modal sensing system;

code to determine parameters for heave, pitch, and roll, based upon the input from the modal sensing system;

code to determine a common damping rate for the controllable suspension dampers based upon the vehicle forward velocity and the determined parameters for heave, pitch, and roll; and, code to control operation of each of the controllable suspension dampers based upon the common damping rate adjusted based upon a location of each of the controllable suspension dampers.

2. The article of manufacture of claim 1, wherein the suspended body comprises a chassis for a motor vehicle.

3. The article of manufacture of claim 1, further comprising code to adjust the common damping rate to a substantially nil damping rate when the vehicle speed is substantially zero.

4. The article of manufacture of claim 1, further comprising code to adjust the common damping rate based upon steering wheel angle.

5. The article of manufacture of claim 4, wherein code to adjust the common damping rate based upon steering wheel angle further comprises code to adjust the common damping rate based upon a rate of change of the steering wheel angle.

6. The article of manufacture of claim 1, further comprising code to adjust the common damping rate based upon an operator-selectable damper mode.

7. The article of manufacture of claim 1, further comprising code to adjust the common damping rate based upon an operator request for braking.

8. The article of manufacture of claim 1, wherein the modal sensing system comprises a plurality of accelerometers, each located near a corner of the vehicle, and, each operable to monitor vehicle heave.

9. The article of manufacture of claim 8, wherein code to determine parameters for heave, pitch, and roll, based upon input from the modal sensing system comprises code for executing a time-based integration of signal outputs from the plurality of accelerometers to determine parameters for vehicle heave, pitch, and roll.

10. The article of manufacture of claim 1, wherein the modal sensing system comprises a device having a plurality of sensing devices operable to monitor vehicle body modal velocities.

11. The article of manufacture of claim 10, wherein the device having a plurality of sensing devices operable to operable to monitor the vehicle body modal velocities is further operable to determine parameters for vehicle heave, pitch, and roll based upon the vehicle body modal velocities.

12. The article of manufacture of claim 1, wherein code to control each of the controllable suspension dampers based upon vehicle forward velocity, steering wheel angle, and the determined parameters for heave, pitch, and roll further comprises code to control each of the controllable suspension dampers as a percent of a maximum damper setting.

13. The article of manufacture of claim 12, wherein the code to control each of the controllable suspension dampers further comprises code to limit damper setting to a minimum damper value and a maximum damper value.

14. The article of manufacture of claim 13, wherein the minimum damper value and the maximum damper value are each determined based upon the vehicle forward velocity.

15. The article of manufacture of claim 12, wherein code to control each of the controllable suspension dampers further comprises code to limit a rate of change of the damper setting.

16. Article of manufacture, comprising a storage medium having a computer algorithm encoded therein for effecting a method to control damping rate of a controllable suspension damper operable to dampen movement between a vehicle chassis and a wheel, the algorithm comprising:

code to determine vehicle forward velocity;
code to monitor input from a modal sensing system;
code to determine parameters for heave, pitch, and roll, based upon the input from the modal sensing system;
code to determine a common damping rate for the controllable suspension damper based upon the vehicle forward velocity and the determined parameters for heave, pitch, and roll; and,
code to control operation of the controllable suspension damper based upon the common damping rate adjusted based upon a location of the controllable suspension damper.

17. Method to control damping of a vehicle body using a plurality of controllable suspension dampers, comprising:

determining vehicle forward velocity;
monitoring input from a modal sensing system;
determining parameters for heave, pitch, and roll, based upon the input from the modal sensing system;
determining a common damping rate for the controllable suspension dampers based upon the vehicle forward velocity and the determined parameters for heave, pitch, and roll; and,
controlling operation of each of the controllable suspension dampers based upon the common damping rate adjusted based upon a location of each of the controllable suspension dampers.

18. The method of claim 17, further comprising adjusting the common damping rate to a substantially nil damping rate when the vehicle speed is substantially zero.

19. The method of claim 17, further comprising adjusting the common damping rate based upon a rate of change of a steering wheel angle.

20. The method of claim 17, further comprising adjusting the common damping rate based upon an operator-selectable damper setting.

21. The method of claim 17, further comprising adjusting the common damping rate based upon an operator request for braking.

22. The method of claim 17, comprising executing a plurality of time-integration equations based upon signal outputs from a plurality of accelerometers to determine parameters for vehicle heave, pitch, and roll.

23. The method of claim 17, wherein controlling each of the controllable suspension dampers based upon vehicle forward velocity, steering wheel angle, and the determined parameters for heave, pitch, and roll further comprises controlling each of the controllable suspension dampers as a percent of a maximum damper setting.

24. The method of claim 23, wherein controlling each of the controllable suspension dampers further comprises limiting the damper setting to a minimum damper value and a maximum damper value.

25. The method of claim 24, further comprising determining the minimum damper value and the maximum damper value based upon the vehicle forward velocity.

26. The method of claim 25, wherein controlling each of the controllable suspension dampers further comprises limiting a rate of change of the damper setting.

27. Method to control suspension damping in a vehicle having a plurality of controllable suspension dampers and an acceleration sensing device, comprising:

monitoring a vehicle forward speed and a steering wheel angle;

determining parameters for vehicle heave, vehicle pitch, and vehicle roll, based upon input from the acceleration sensing device; and, simultaneously controlling each of the controllable suspension dampers based upon vehicle forward speed, steering wheel angle, and the determined parameters for vehicle heave, vehicle pitch, and vehicle roll.

* * * * *